United States Patent
Saiki et al.

(12) 
(10) Patent No.: US 6,856,691 B2
(45) Date of Patent: Feb. 15, 2005

(54) ELECTRONIC APPARATUS INCLUDING LOUDSPEAKER SYSTEM

(75) Inventors: Shuji Saiki, Uda-gun (JP); Sawako Usuki, Kobe (JP); Tetsuo Murakami, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 20 days.

(21) Appl. No.: 10/649,970

(22) Filed: Aug. 28, 2003

(65) Prior Publication Data

US 2004/0047120 A1 Mar. 11, 2004

(30) Foreign Application Priority Data

Aug. 29, 2002 (JP) ........................................ 2002-250901

(51) Int. Cl.[7] .............................................. H04R 25/00
(52) U.S. Cl. ........................ 381/388; 381/152; 381/386
(58) Field of Search ................................ 381/306, 333, 381/335, 345, 346, 347, 350, 352, 160, 386, 388, 396, 152, 190, 191, 680–683

(56) References Cited

U.S. PATENT DOCUMENTS

| 6,580,799 | B1 | * | 6/2003 | Azima et al. | ................ | 381/333 |
| 2001/0026625 | A1 | * | 10/2001 | Azima et al. | ................ | 381/152 |
| 2003/0059068 | A1 | * | 3/2003 | Bank et al. | .................. | 381/152 |

FOREIGN PATENT DOCUMENTS

JP  2001-511921  8/2001

* cited by examiner

Primary Examiner—Huyen D. Le
(74) Attorney, Agent, or Firm—Wenderoth, Lind & Ponack, L.L.P.

(57) ABSTRACT

The present invention provides an electronic apparatus including a touch pad. The electronic apparatus also includes a housing and a mechanical acoustic transducer. The housing supports an outer circumferential portion of the touch pad via a suspension to provide a space for sound emission between the housing and the touch pad. The electromechanical acoustic transducer is connected to the housing, and emits sound into the space. When the electromechanical acoustic transducer emits the sound into the space, an energy of the sound emitted causes the touch pad to vibrate and thereby to output sound outside the electronic apparatus.

7 Claims, 4 Drawing Sheets

ELECTRONIC APPARATUS INCLUDING LOUDSPEAKER SYSTEM

BACKGROUND OF THE INVENTION

1. Field of the Invention

The present invention relates to an electronic apparatus, such as a personal computer, and more particularly to an electronic apparatus including a touch pad, or a touch panel, as an input device.

2. Description of the Background Art

Figure 8:
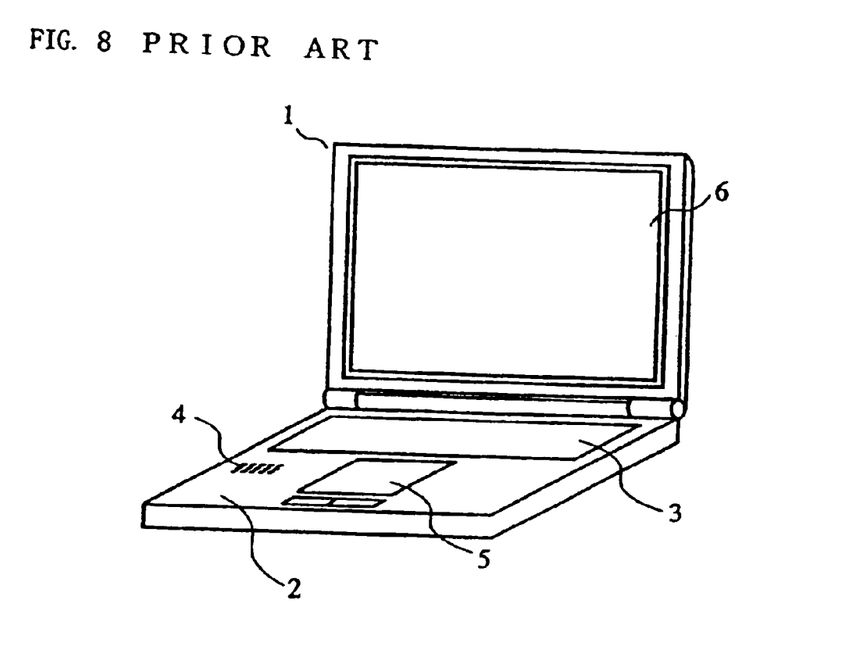
FIG. 8 is an external view of a conventional notebook personal computer having a touch pad incorporated therein.

Conventionally, there has been devised an electronic apparatus using a touch pad, or a touch panel, as an input device. Referring to FIG. 8, such a conventional electronic apparatus will be described taking a personal computer as an example. FIG. 8 is an external view of a conventional notebook personal computer having a touch pad incorporated therein. In FIG. 8, a personal computer 1 includes a housing 2, a keyboard 3, sound holes 4, a touch pad 5, and a liquid crystal display (LCD) 6. The personal computer 1 also has a loudspeaker system provided inside the housing 2.

In the personal computer 1, the user moves a pointer displayed on the liquid crystal display 6 by moving his/her finger along an operating surface of the touch pad 5, or the user performs an operation corresponding to a click operation of a mouse by tapping the top of the operating surface. The loudspeaker system reproduces operation sounds of the touch pad 5, and audio information, such as an acoustic signal or speech, outputted by an electric circuit (not shown) within the personal computer 1. Reproduced sound is emitted through the sound holes 4 provided in the housing 2 to the outside of the personal computer 1.

In a conventional personal computer as described above, sound reproduction and an input operation are performed by different devices placed in different locations. That is, the loudspeaker system and the touch pad are separately provided in different locations, preventing downsizing and space saving of the personal computer.

SUMMARY OF THE INVENTION

Therefore, an object of the present invention is to provide an electronic apparatus capable of realizing downsizing and space saving even if a loudspeaker system and a touch pad are included therein.

The present invention has the following features to attain the object mentioned above.

A first aspect of the present invention is directed to an electronic apparatus including a touch pad. The electronic apparatus includes a case and an electromechanical acoustic transducer. The case supports an outer circumferential portion of the touch pad via a suspension to provide a space for sound emission between the case and the touch pad. The case may be integrally formed with a housing of the electronic apparatus, or maybe provided separate from the housing. The electromechanical acoustic transducer is connected to the case, and emits sound into the space. When the electromechanical acoustic transducer emits the sound into the space, an energy of the sound emitted causes the touch pad to vibrate and thereby to output sound outside the electronic apparatus.

The electronic apparatus according may further include a signal processing section. The signal processing section receives from the touch pad a signal indicating that the touch pad has been operated, and then applies another signal to the electromechanical acoustic transducer.

Further, upon receipt of the signal from the touch pad, the signal processing section may apply to the electromechanical acoustic transducer a signal at a frequency lower than a minimum resonance frequency of the electromechanical acoustic transducer. Furthermore, upon receipt of the signal from the touch pad, the signal processing section may apply to the electromechanical acoustic transducer a signal having a frequency at which resonance of the touch pad and the suspension occurs.

The case may be provided separate from a housing of the electronic apparatus, and the case may be attached to the electronic apparatus by connection to the housing.

A scheme of the electromechanical acoustic transducer is selected from the group consisting of an electrodynamic type, an electromagnetic type, a piezoelectric type, and an electrostatic type.

A second aspect of the present invention is directed to a touch pad unit to be attached to an electronic apparatus. The touch pad unit includes a touch pad, a unit case, and an electromechanical acoustic transducer. The unit case supports an outer circumferential portion of the touch pad via a suspension to provide a space for sound emission between the case and the touch pad. The electromechanical acoustic transducer is connected to the unit case, and emits sound into the space. When the electromechanical acoustic transducer emits the sound into the space, an energy of the sound emitted causes the touch pad to vibrate and thereby to output sound outside the touch pad unit.

According to the present invention, it is possible to place an electromechanical acoustic transducer behind a touch pad of an electronic apparatus. Accordingly, there is no need of placing the electromechanical acoustic transducer in a location which is different from the location of the touch pad, and therefore it is possible to realize downsizing and space saving of the electronic apparatus. Further, according to the present invention, it is possible to allow the touch pad to have a function as a loudspeaker system for reproducing sound, in addition to its original function as an input device. In this loud speaker system, there is substantially no possibility that dust or dirt might fall on a diaphragm of the electromechanical acoustic transducer, and therefore no deterioration in sound quality is caused.

Furthermore, by providing the electronic apparatus with a signal processing section, it is made possible to notify the user at least by vibration that the touch pad has been operated. It is conceivable that such a notification by sound and vibration would be useful for an audibly handicapped person, for example.

Further still, by allowing the signal processing section to apply to the electromechanical acoustic transducer a signal at a frequency lower than a minimum resonance frequency of the electromechanical acoustic transducer, it is made possible to notify the user, by only vibration of the touch pad, that the touch pad has been operated. It is conceivable that such a notification by only vibration would be useful, for example, in the case of using the electronic apparatus in the situation where sound emitted by the electronic apparatus could be noise which is annoying to other people around the user (specifically, in a train or the like).

Further still, by allowing the signal processing section to apply to the electromechanical acoustic transducer a signal having a frequency at which resonance of the touch pad and a suspension occurs, it is made possible to increase vibration of the touch pad. Therefore, the user is able to perceive the vibration of the touch pad with more certainty.

Further still, by providing a case which is separate from a housing of the electronic apparatus, it is made possible to provide devices, such as the touch pad, the electromechanical acoustic transducer, etc., as a single modularized part, thereby facilitating easy production of the electronic apparatus.

These and other objects, features, aspects and advantages of the present invention will become more apparent from the following detailed description of the present invention when taken in conjunction with the accompanying drawings.

DESCRIPTION OF THE PREFERRED EMBODIMENTS (First Embodiment)

Figure 1:
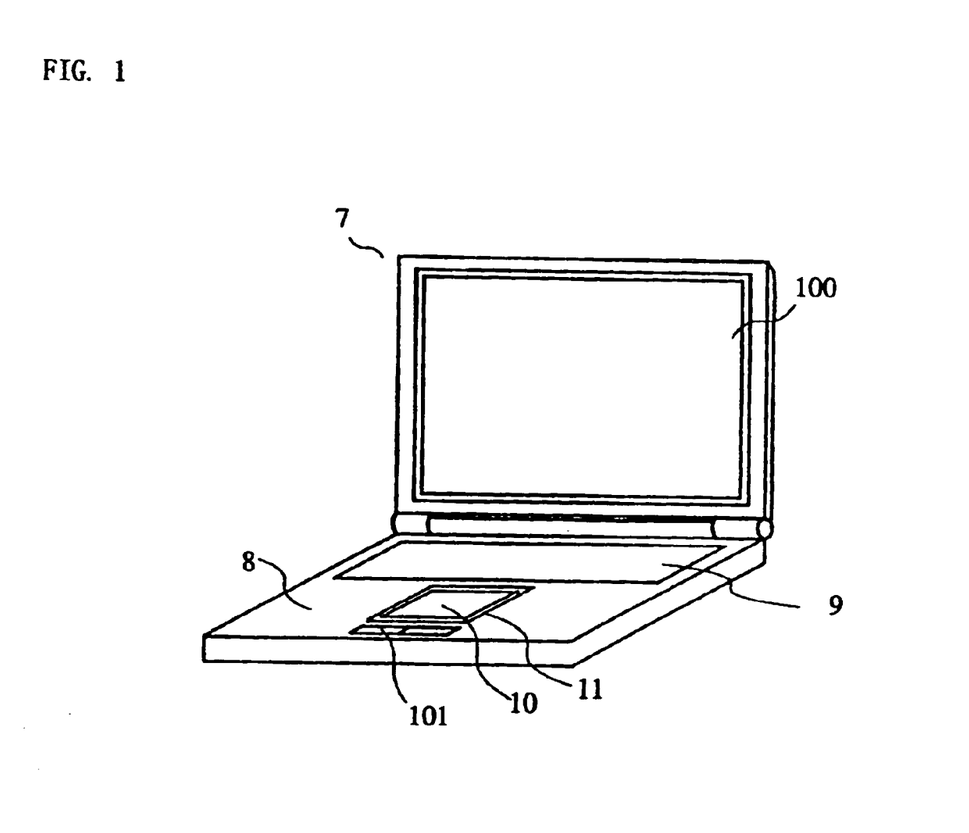
FIG. 1 is an external view of a notebook personal computer which is an example of an electronic apparatus according to a first embodiment.

An electronic apparatus according to a first embodiment of the present invention will now be described. A configuration of the electronic apparatus according to the first embodiment is explained with reference to FIGS. 1 to 4. FIG. 1 is an external view of a notebook personal computer which is an example of the electronic apparatus according to the first embodiment. In FIG. 1, a personal computer 7 includes a housing 8, a keyboard 9, a touch pad 10, an outer frame 11, a liquid crystal display 100, and a button 101. The personal computer 7 has an electromechanical acoustic transducer (which will be described with reference to FIG. 2) provided inside the housing 8. Although the electronic apparatus according to the first embodiment is described as being a notebook personal computer, the first embodiment is applicable to any electronic apparatus, e.g., a desktop personal computer or a personal digital assistant (PDA), so long as the electronic apparatus includes a touch pad. In FIG. 1, although the touch pad 10 is placed in the vicinity of the keyboard 9, the touch pad 10 may be placed at any location in the personal computer 7. Moreover, although the button 101 is illustrated in FIG. 1 so as to be separated from the touch pad 10, the touch pad 10 may be configured so as to include the button 101. Note that elements included in a typical personal computer, e.g., a CPU, a hard disk, etc., included in the personal computer 7, are not illustrated in drawings.

Figure 2:
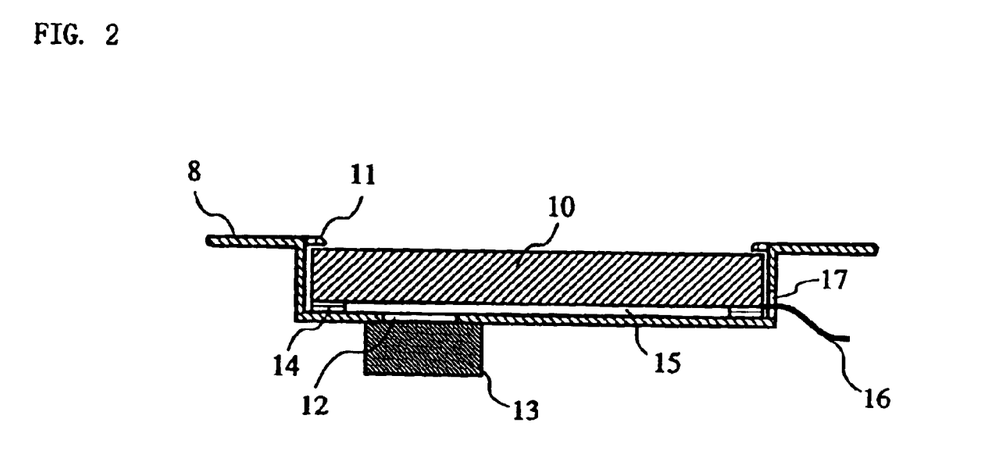
FIG. 2 is a cross-sectional view of a portion of a personal computer 7 illustrated in FIG. 1, in which a touch pad 10 is attached.

FIG. 2 is a cross-sectional view of a portion of the personal computer 7 illustrated in FIG. 1, in which the touch pad 10 is attached. As illustrated in FIG. 2, in addition to the elements illustrated in FIG. 1, the personal computer 7 includes an electromechanical acoustic transducer 13, a suspension 14 which is an elastic body, and a flexible cord 16 for inputting and outputting an electric signal. Note that the personal computer 7 also includes a signal processing section and a signal amplifying section (which will be described with reference to FIG. 4), in addition to the elements illustrated in FIGS. 1 and 2.

As illustrated in FIG. 2, the housing 8 includes a recessed portion. The suspension 14 is bonded to a bottom face of the recessed portion of the housing 8 as well as to an outer circumferential portion of the touch pad 10. Specifically, the outer circumferential portion of the touch pad 10 is supported by the housing 8 via the suspension 14, such that a space 15 is provided between the housing 8 and the touch pad 10. Since the suspension 14 is an elastic body, such as a foamed rubber, the touch pad 10 is supported so as to be caused to vibrate by external forces. The frame 11 is attached to an opening of the recessed portion of the housing 8.

The housing 8 has a hollow inside. Provided inside the housing 8 are the electromechanical acoustic transducer 13, and electronic circuits, e.g., the aforementioned signal processing section and the aforementioned signal amplifying section. The housing 8 has a sound hole 12 and a cord hole 17. The sound hole 12 is provided in a portion of the housing 8 which faces the space 15. The electromechanical acoustic transducer 13 is provided within the housing 8 so as to block the sound hole 12, and therefore the sound hole 12 is able to play a role as an acoustic coupling means of transferring sound emitted by the electromechanical acoustic transducer 13 to the space 15. In order to prevent leakage of the sound emitted by the electromechanical acoustic transducer 13, it is preferred that the space 15 is configured so as to preserve high airtightness (which is ideally as high as airtightness of a sealed space). Note that the space 15 functions as an acoustic compliance so as to attenuate high frequency sound emitted by the electromechanical acoustic transducer 13. Therefore, in order to reproduce wideband sound, the volume of the space 15 may be reduced to as small as possible (e.g., widths of the bottom face of the recessed portion of the housing 8 and the touch pad 10 are reduced to as narrow as possible). The flexible cord 16 is connected at one end to the touch pad 10 and at the other end to the aforementioned signal processing section (not shown) through the cord hole 17.

Figure 3:
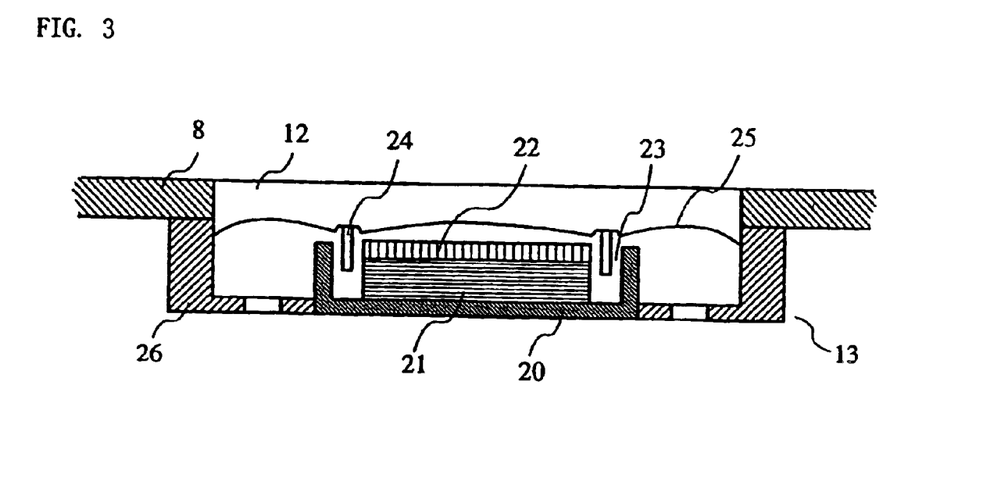
FIG. 3 is a cross-sectional view of an electromechanical acoustic transducer of an electrodynamic type illustrated as an example of an electromechanical acoustic transducer 13 illustrated in FIG. 2.

FIG. 3 is a cross-sectional view of an electromechanical acoustic transducer of an electrodynamic type illustrated as an example of the electromechanical acoustic transducer 13 illustrated in FIG. 2. In FIG. 3, the electromechanical acoustic transducer 13 includes a pot-type yoke 20, a magnet 21, a plate 22, a voice coil 24, a diaphragm 25, and a frame 26. The frame 26 is attached to the housing 8 around the perimeter of the sound hole 12 so as to block the sound hole 12. The yoke 20 is fixed in the frame 26 such that lower portions of an outer circumferential surface thereof are fit into the center of the frame 26. The magnet 21 is mounted on the center of the yoke 20. The plate 22 is provided on top of the magnet 21. The yoke 20 and the plate 22 are placed such that a magnetic cavity 23 is provided between an inner circumferential surface of the yoke 20 and an outer circumferential surface of the plate 22. The diaphragm 25 is fixed at its outer circumference to the frame 26. The voice coil 24 is fixed to the diaphragm 25 so as to be inserted into the magnetic cavity 23.

Figure 4:
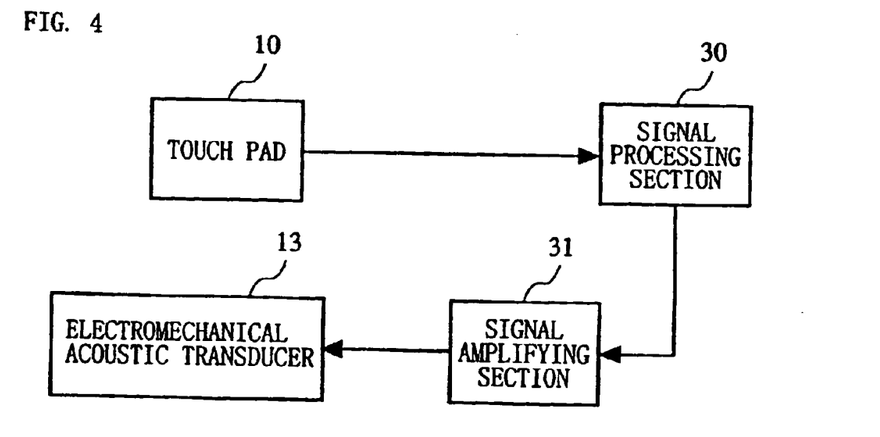
FIG. 4 is a block diagram illustrating a configuration for performing signal processing in a personal computer 7 illustrated in FIG. 1.

FIG. 4 is a block diagram illustrating a configuration for performing signal processing in the personal computer 7 illustrated in FIG. 1. As illustrated in FIG. 4, the personal computer 7 includes a signal processing section 30 and a signal amplifying section 31, in addition to the above-described elements, such as the touch pad 10 and the electromechanical acoustic transducer 13. The signal processing section 30 is connected to the touch pad 10 via the flexible cord 16 illustrated in FIG. 2. The signal processing section 30 is also connected to the signal amplifying section 31 which is connected to the electromechanical acoustic transducer 13. The signal processing section 30 applies an audio signal, such as a speech signal or a music signal, generated by a CPU (not shown) or the like of the personal computer 7 to the electromechanical acoustic transducer 13 via the signal amplifying section 31. The signal processing section 30 also applies a prescribed signal to the electromechanical acoustic transducer 13 via the signal amplifying section 31 in response to a signal supplied by the touch pad 10. The signal amplifying section 31 amplifies a signal received from the signal processing section 30, and outputs a resultant signal to the electromechanical acoustic transducer 13.

With the configuration as described above, the personal computer 7 can allow the touch pad 10 to function as a vibration panel of a loudspeaker system. That is, it is possible to allow the touch pad 10 to generate sound. An operation for allowing the touch pad 10 to generate sound is described below.

When sound is reproduced, an electric signal is applied from the signal processing section 30 through the signal amplifying section 31 to the voice coil 24 of the electromechanical acoustic transducer 13. Thus, driving force is generated in the voice coil 24, so that the diaphragm 25 coupled to the voice coil 24 is caused to vibrate, thereby emitting sound. The sound emitted by the diaphragm 25 is transferred through the sound hole 12 to the space 15. Since the outer circumferential portion of the touch pad 10 is supported via the suspension 14, the touch pad 10 is caused to vibrate by the pressure of the sound transferred to the space 15. In this manner, the electromechanical acoustic transducer 13 acoustically drives the touch pad 10. Thus, it is possible to allow the touch pad 10 to generate sound.

With the configuration as described above, the personal computer 7 can allow the touch pad 10 to function as a loudspeaker system. Moreover, the personal computer 7 has a function of notifying the user of an operation status of the touch pad 10. Such a function of the personal computer 7 is described below.

In response to the user's operation, the touch pad 10 outputs a signal representing the details of the operation to the signal processing section 30. Specifically, when the user contacts the touch pad 10 with his/her finger, the touch pad 10 outputs the signal representing the details of the operation to the signal processing section 30. In response to the signal from the touch pad 10, the signal processing section 30 outputs an operation confirmation signal to the signal amplifying section 31. The term "operation confirmation signal" as described herein refers to a signal which indicates that the touch pad 10 has been operated by the user. The operation confirmation signal allows generation of sound at a prescribed frequency in the electromechanical acoustic transducer 13. The operation confirmation signal is amplified by the signal amplifying section 31, and then outputted to the electromechanical acoustic transducer 13.

Upon receipt of the operation confirmation signal, the electromechanical acoustic transducer 13 is operated in a manner similar to the above-described case of receiving an audio signal. Specifically, the diaphragm 25 is caused to vibrate, thereby acoustically driving the touch pad 10. Thus, the user can recognize, by sound emitted by the touch pad 10, that the touch pad 10 has been operated. Since the user contacts the touch pad 10 with his/her finger, vibration of the touch pad 10 is transmitted to the user's finger. Accordingly, also by the vibration of the touch pad 10, the user can recognize that the touch pad 10 has been operated. Thus, the personal computer 7 can notify the user that the touch pad 10 has been operated. When the user contacts the touch pad 10 which is a diaphragm, the user's contact with the touch pad 10 is light, and therefore it is considered that there is no significant influence on the sound emitted by the touch pad 10.

As described above, the personal computer 7 can notify the user of an operation status of the touch pad 10 by sound and vibration. Moreover, the personal computer 7 can change a prescribed frequency of the operation confirmation signal to select whether to carry out the notification by sound and vibration or by only vibration. The details of such selection are described below.

First, consider a case where the aforementioned prescribed frequency is at such a level as to enable the electromechanical acoustic transducer 13 to reproduce sound at a sufficient sound pressure level, i.e. a case where the prescribed frequency is equal to or more than a minimum resonance frequency of the electromechanical acoustic transducer 13. The term "sufficient sound pressure level" as described herein refers to a sound pressure level which is sufficiently high to enable a human to perceive sound at that level. In this case, the electromechanical acoustic transducer 13 generates sound at the sufficient sound pressure level, and therefore the touch pad 10 is able to generate sound at the sufficient sound pressure level. Accordingly, the user can perceive both sound and vibration from the touch pad 10. Thus, when the prescribed frequency is equal to or more than the minimum resonance frequency of the electromechanical acoustic transducer 13, the user can confirm by sound and vibration that the touch pad 10 has been operated.

Next, consider a case where the aforementioned prescribed frequency is at a sufficiently low level which is lower than the level of the minimum resonance frequency of the electromechanical acoustic transducer 13. Specifically, the expression that the prescribed frequency is "sufficiently low" as described herein means that the prescribed frequency is at such a level where almost no sound is generated by the touch pad 10 due to the ability of the electromechanical acoustic transducer 13 (i.e., sound generated cannot be perceived by a human). When the prescribed frequency, i.e., the frequency of sound to be reproduced, is at such a sufficiently low level, the efficiency of transduction from vibration to sound is significantly low. Therefore, when a signal at a sufficiently low frequency is applied to the electromechanical acoustic transducer 13, the diaphragm 25 is caused to vibrate, though the sound pressure level is extremely low. Consequently, although the vibration of the diaphragm 25 is transferred through the space 15 to the touch pad 10, the sound pressure level at the touch pad 10 is extremely low, so that almost no audible sound is generated by the touch pad 10. Accordingly, the user cannot perceive sound from the touch pad 10, while capable of perceiving vibration of the touch pad 10. Thus, when the prescribed frequency is lower than the minimum resonance frequency of the electromechanical acoustic transducer 13, the user is able to confirm by only vibration that the touch pad 10 has been operated.

As described above, by changing the frequency of a signal applied to the electromechanical acoustic transducer 13, it is possible to select whether to allow the user to perceive only vibration of the touch pad 10 or both vibration and sound of the touch pad 10. In the first embodiment, it is assumed that the signal processing section 30 can be operated in two preset modes, i.e., a mode of notifying an operation confirmation of the touch pad 10 by vibration and sound, and a mode of notifying by only vibration. It is also assumed that switching between the modes can be performed by the user. Specifically, in the mode of notifying by vibration and sound, the signal processing section 30 outputs as an operation confirmation signal a signal at a frequency equal to or more than the minimum resonance frequency of the electromechanical acoustic transducer 13. On the other hand, in the mode of notifying by only vibration, the signal processing section 30 outputs as the operation confirmation signal a signal at a frequency lower than the minimum resonance frequency of the electromechanical acoustic transducer 13. Note that a minimum resonance frequency of a typical electromechanical acoustic transducer used in a portable terminal apparatus or the like is between about 600 Hz and about 700 Hz. Therefore, when the minimum resonance frequency of the electromechanical acoustic transducer 13 is 700 Hz, the signal processing section 30 may be set such that a signal at a frequency of 700 Hz or more is outputted as the operation confirmation signal in the mode of notifying by vibration and sound, and a signal at a frequency lower than 700 Hz is outputted as the operation confirmation signal in the mode of notifying by only vibration.

As a specific usage of the above-described modes, it is conceivable that in the situation where it is preferred to make no sound, e.g., when using the personal computer 7 in a train, the personal computer 7 is set in the mode of notifying by only vibration. Note that any method other than selection by the user may be employed for switching between the modes, e.g., the modes are automatically switched in accordance with a prescribed condition.

It is preferred that the prescribed frequency used in the mode of notifying by only vibration is set so as to be equal to a frequency at which resonance of the suspension 14 and the touch pad 10 occurs. Specifically, assuming that the prescribed frequency is f, a spring constant of the suspension 14 is s, and the mass of the touch pad 10 is M, it is preferred that prescribed frequency f is set so as to satisfy the following relationship:

$$f = \frac{1}{2\pi}\sqrt{\frac{s}{M}}$$

Such setting increases the vibration of the touch pad 10, and therefore the vibration is transmitted to the user more reliably.

Thus, according to the first embodiment, it is possible to place an electromechanical acoustic transducer behind a touch pad. Accordingly, there is no need of placing the electromechanical acoustic transducer in a location which is different from the location of the touch pad, and therefore it is possible to realize downsizing and space saving of an electronic apparatus.

Further, according to the first embodiment, it is possible to allow the touch pad to have a function as a loudspeaker system for reproducing sound, in addition to its original function as an input device. Note that a conventional electronic apparatus is configured such that the electromechanical acoustic transducer is provided inside a housing of the apparatus, so that sound is emitted through a plurality of sound holes provided in the housing (see FIG. 8). Sound holes when provided in a personal computer are often provided in a location facing upward when the personal computer is properly placed. Accordingly, there is a possibility that dust or dirt might fall through the sound holes onto a diaphragm of the electromechanical acoustic transducer, resulting in deterioration in sound quality or generation of unusual noise. On the other hand, in the first embodiment, the touch pad is located over a sound hole, and therefore there is no possibility that dust or dirt might fall on the diaphragm of the electromechanical acoustic transducer. Thus, no deterioration in sound quality is caused.

Furthermore, according to the first embodiment, by applying an electric signal to the electromechanical acoustic transducer in accordance with an operation on the touch panel, it is possible to notify the user by vibration that the touch pad has been operated. Specifically, the user can directly confirm an input operation by the touch pad as the vibration of the touch pad through a sense of touch of his/her finger. Therefore, the first embodiment is expected as being useful, particularly, for an audibly handicapped person. Moreover, since it is possible to select whether the notification to the user is carried out by vibration and sound or by only vibration, a problem concerning noises which are annoying to other people around the user can be solved.

(Second Embodiment)

An electronic apparatus according to a second embodiment will now be described. A configuration of the electronic apparatus according to the second embodiment is explained with reference to FIGS. 5 to 7. Similar to the first embodiment, the electronic apparatus according to the second embodiment is a notebook personal computer. Although not shown in drawings, the external view of the electronic apparatus according to the second embodiment is almost the same as that of the electronic apparatus illustrated in FIG. 1.

The second embodiment is different from the first embodiment in that elements, such as a touch pad and an electromechanical acoustic transducer, are configured as a unit separate from a housing of the notebook personal computer. In the configuration according to the first embodiment, the electromechanical acoustic transducer 13 is provided inside the housing 8, and the touch pad 10 is provided outside the housing 8. Accordingly, when producing the electronic apparatus according to the first embodiment, the electromechanical acoustic transducer 13 and the touch pad 10 are required to be separately provided inside and outside the casing 8, and therefore the production is made complicated. On the other hand, in the second embodiment, the touch pad, the electromechanical acoustic transducer, etc., are provided as a single unit, thereby facilitating easy production of the electronic apparatus. Hereinafter, the unit including the touch pad, the mechanical acoustic transducer, etc., is referred to as the "touch pad unit".

Figure 5:
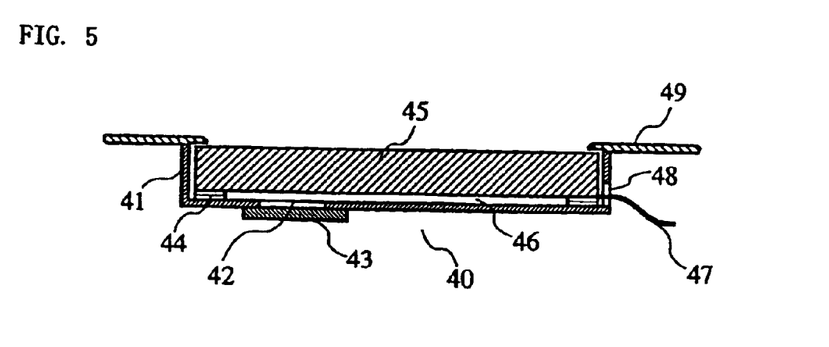
FIG. 5 is a cross-sectional view of a portion of an electronic apparatus according to a second embodiment, in which a touch pad unit is attached.
Figure 6:
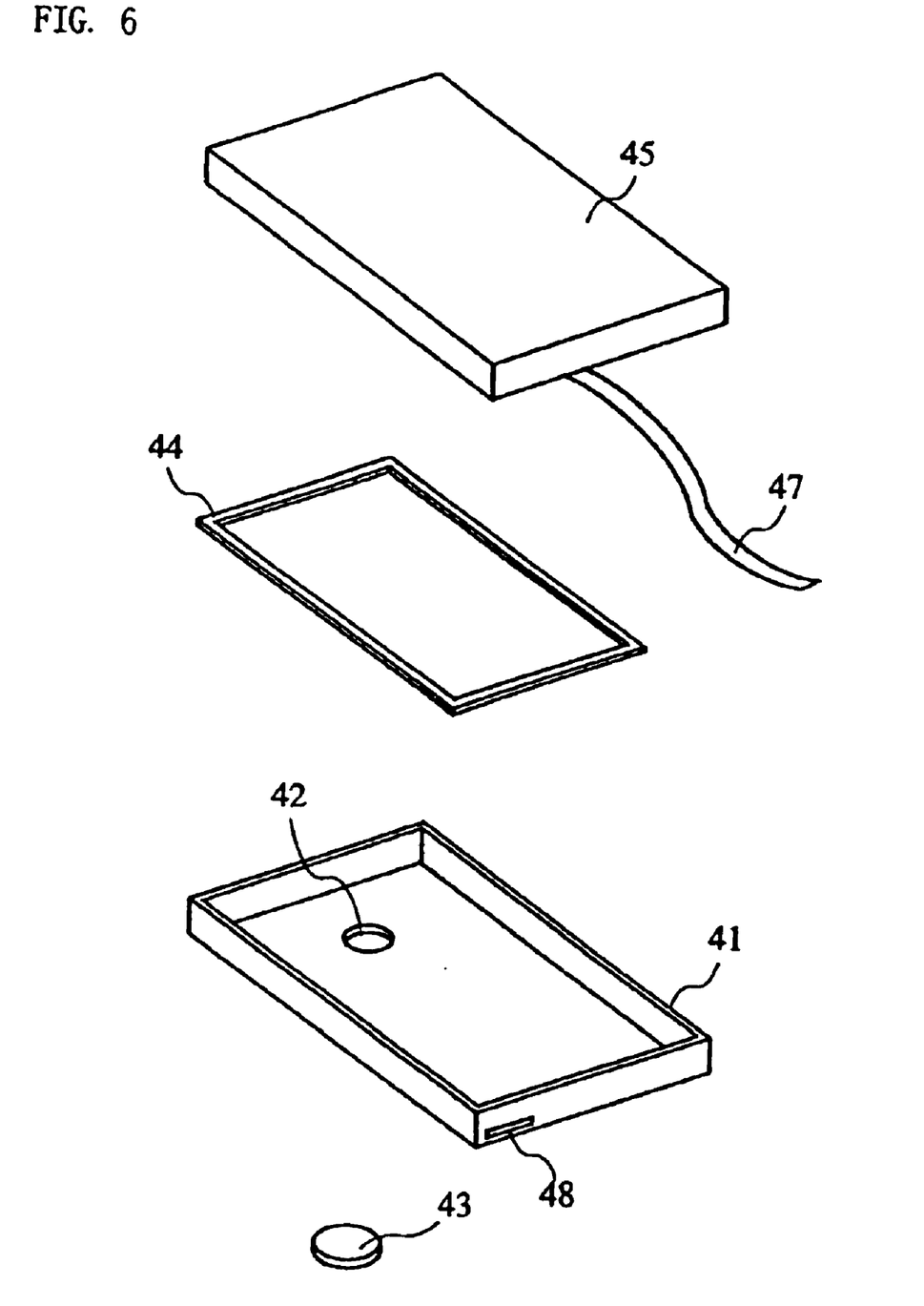
FIG. 6 is an exploded perspective view of a touch pad unit to be attached to an electronic apparatus according to the second embodiment.

FIG. 5 is a cross-sectional view of a portion of the electronic apparatus according to the second embodiment, in which a touch pad unit is attached. FIG. 6 is an exploded perspective view of a touch pad unit to be attached to the electronic apparatus according to the second embodiment. As illustrated in FIG. 5, a touch pad unit 40 is attached to a housing 49 of a notebook personal computer which is the electronic apparatus according to the second embodiment. In FIGS. 5 and 6, the touch pad unit 40 includes a unit case 41, an electromechanical acoustic transducer 43, a suspension 44, a main body of a touch pad 45 (hereinafter, simply referred to as the "touch pad 45"), and a flexible cord 47 for inputting and outputting an electric signal.

The unit case 41 has a box-like shape and is open on a topside. The housing 49 has a hole having almost the same size as that of the opening of the unit case 41 which is connected to the housing 49 such that the opening thereof is aligned with the hole of the housing 49. The suspension 44 is bonded to a bottom face of the unit case 41 as well as to an outer circumferential portion of the touch pad 45. Specifically, the outer circumferential portion of the touch pad 45 is supported by the unit case 41 via the suspension 44, such that a space 46 is provided between the unit case 41 and the touch pad 45. Similar to the first embodiment, the suspension 44 is an elastic body, and therefore the touch pad 45 is supported so as to be caused to vibrate by external forces.

The unit case 41 has a sound hole 42 provided in its bottom face, and a cord hole 48 provided in its side face. The sound hole 42 is provided in a portion of the unit case 41 which faces the space 46. The electromechanical acoustic transducer 43 is provided outside the unit case 41 (at the side opposite to the side on which the touch pad 45 and the suspension 44 are provided) so as to block the sound hole 42. Similar to the first embodiment, in the second embodiment with the configuration as described above, sound emitted by the electromechanical acoustic transducer 43 is transferred from the sound hole 42 through the space 46 to the touch pad 45. Note that the second embodiment is similar to the first embodiment in that it is preferred that the space 46 is configured so as to preserve high airtightness, and reproduction of high frequency sound is improved by reducing the volume of the space 46. The flexible cord 47 is connected at one end to the touch pad 45 and at the other end to a signal processing section (which is similar to the signal processing section 30 of the first embodiment) through the cord hole 48.

Figure 7:
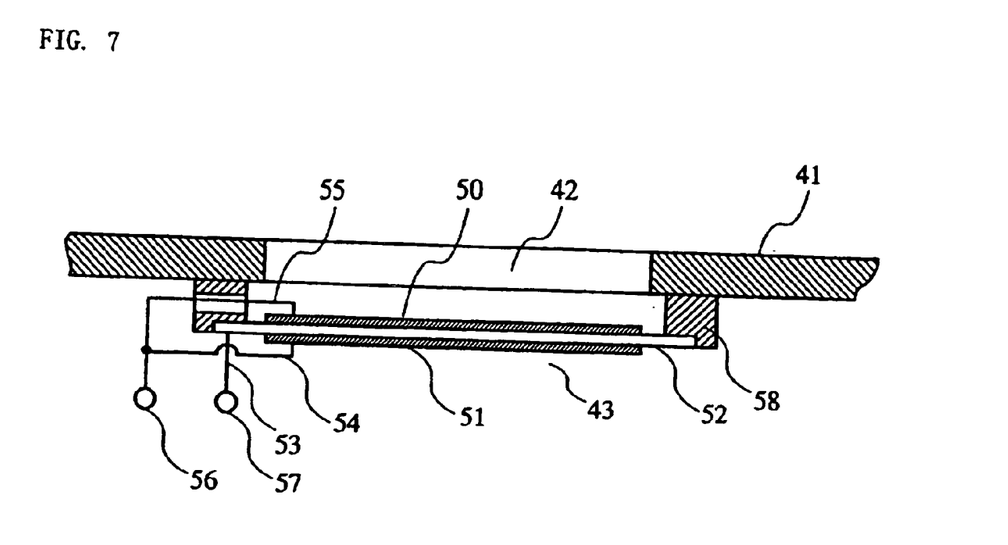
FIG. 7 is a cross-sectional view of an electromechanical acoustic transducer of a piezoelectric type illustrated as an example of an electromechanical acoustic transducer 43 illustrated in FIG. 5.

FIG. 7 is a cross-sectional view of an electromechanical acoustic transducer of a piezoelectric type illustrated as an example of the electromechanical acoustic transducer 43 illustrated in FIG. 5. In FIG. 7, the electromechanical acoustic transducer 43 includes piezoelectric elements 50 and 51, an intermediate electrode 52, lead wires 53, 54, and 55, input terminals 56 and 57, and a frame 58. The frame 58 is connected to the unit case 41. The intermediate electrode 52 is fixed at its outer circumferential portion to the frame 58. The intermediate electrode 52 is attached at one face to the piezoelectric element 50 and at the other face to the piezoelectric element 51. The piezoelectric elements 50 and 51 are formed of a conductive material, such as phosphor bronze. The lead wire 53 is used for inputting an electric signal into the intermediate electrode 52, and for connecting the input terminal 57 with the intermediate electrode 52. The lead wire 54 is used for inputting an electric signal into the piezoelectric element 51, and for connecting the input terminal 56 with the piezoelectric element 51. The lead wire 55 is used for inputting an electric signal into the piezoelectric element 50, and for connecting the input terminal 56 with the piezoelectric element 50.

An operation of the thus-configured notebook personal computer of the second embodiment is similar to that of the notebook personal computer of the first embodiment. Specifically, the second embodiment is similar to the first embodiment with respect to an operation of acoustically driving the touch pad 45 by sound emitted by the electromechanical acoustic transducer 43. Although not shown in drawings, the notebook personal computer of the second embodiment includes a signal processing section and a signal amplifying section as in the case of the first embodiment. Accordingly, it is possible to notify the user of an operation confirmation of the touch pad 45 by vibration and sound or by only vibration. Such a notifying operation is also carried out in a manner similar to the first embodiment.

As described above, the second embodiment is different from the first embodiment in that the touch pad 45, the suspension 44, the electromechanical acoustic transducer 43, etc., are integrally combined with the unit case 41 so as to form the touch pad unit 40. With such a configuration, when producing an electronic apparatus, it is possible to incorporate the touch pad 45, the suspension 44, and the electromechanical acoustic transducer 43 into the unit case 41, thereby forming the touch pad unit 40 as a module, and then to incorporate the modularized touch pad unit 40 into the electronic apparatus. Such a production method facilitates easy production of the electronic apparatus as compared to the first embodiment.

Thus, the second embodiment can achieve effects similar to those achieved by the first embodiment. Moreover, by providing a touch pad and an electromechanical acoustic transducer in the form of a module, it is made possible to facilitate easy production of an electronic apparatus.

Similar to the first embodiment, the second embodiment is applicable to any electronic apparatus. Moreover, the touch pad unit 40 may be placed at any location in the electronic apparatus.

In the first embodiment, a transducer scheme of the electromechanical acoustic transducer 13 is an electrodynamic type, while in the second embodiment, a transducer scheme of the electromechanical acoustic transducer 43 is a piezoelectric type. In the first and second embodiments, any transducer scheme selected from among the piezoelectric type, an electromagnetic type, an electrostatic type, etc., can achieve effects similar to those described in the first and second embodiments as long as the electromechanical acoustic transducer has a function of emitting sound from a diaphragm.

In the first and second embodiments, the location of a sound hole, which is also the location at which the electromechanical acoustic transducer is attached, maybe anywhere in the electronic apparatus as long as the sound hole faces a space provided between a touch pad and a housing (or a unit case). So long as the sound hole is located so as to be in communication with the space, sound emitted by the electromechanical acoustic transducer is transferred to the touch pad, and therefore no significant difference is observed regardless of the location of the sound hole.

In the first and second embodiments, the touch pad has a rectangular shape. The present invention employs a method for acoustically driving the touch pad by the pressure of sound emitted by the electromechanical acoustic transducer, and therefore it is possible to acoustically drive the touch pad regardless of the shape of the touch pad. Accordingly, the shape of the touch pad is not limited to a rectangle, and any shape, e.g., a circle, an ellipse, or a polygon, may be employed in other embodiments to achieve acoustic reproduction similar to that achieved in the first and second embodiments.

In the first and second embodiments, the touch pad is acoustically driven by the electromechanical acoustic transducer. In other embodiments, a touch panel, rather than the touch pad, may be acoustically driven. Specifically, a transparent touch panel is used instead of using the touch pad 10 illustrated in FIG. 1. Moreover, a display device, such as an LCD, is provided on the bottom face of the recessed portion of the housing 8, so as not to block a sound hole provided in the bottom face of the recessed portion of the housing 8. In the case where the electromechanical acoustic transducer cannot be directly connected to the sound hole due to the thickness of the display device, the electromechanical acoustic transducer is connected to the sound hole via an acoustic tube. Thus, it is possible to reliably transfer sound emitted by the electromechanical acoustic transducer to a space (in this case, a space between the touch panel and the display device). The thus-configured electronic apparatus can also acoustically drive the touch panel, thereby achieving effects similar to those achieved by the first and second embodiments. Further, by providing the electronic apparatus with the signal processing section 30 and the signal amplifying section 31 which are described in the first embodiment, it is possible to notify the user whether the touch panel has been operated. Furthermore, by adjusting the frequency of a signal to be applied to the electromechanical acoustic transducer when the touch panel is operated, it is made possible to make a notification to the user by vibration and sound or by only vibration as in the case of the first and second embodiments.

While the invention has been described in detail, the foregoing description is in all aspects illustrative and not restrictive. It is understood that numerous other modifications and variations can be devised without departing from the scope of the invention.

What is claimed is:

1. An electronic apparatus including a touch pad, comprising:
   a case for supporting an outer circumferential portion of the touch pad via a suspension to provide a space for sound emission between the case and the touch pad; and
   an electromechanical acoustic transducer for emitting sound into the space, the electromechanical acoustic transducer being connected to the case,
   wherein when the electromechanical acoustic transducer emits the sound into the space, an energy of the sound emitted causes the touch pad to vibrate and thereby to output sound outside the electronic apparatus.

2. The electronic apparatus according to claim 1, further comprising a signal processing section for receiving from the touch pad a signal indicating that the touch pad has been operated, and then applying another signal to the electromechanical acoustic transducer.

3. The electronic apparatus according to claim 2, wherein upon receipt of the signal from the touch pad, the signal processing section applies to the electromechanical acoustic transducer a signal at a frequency lower than a minimum resonance frequency of the electromechanical acoustic transducer.

4. The electronic apparatus according to claim 3, wherein upon receipt of the signal from the touch pad, the signal processing section applies to the electromechanical acoustic transducer a signal having a frequency at which resonance of the touch pad and the suspension occurs.

5. The electronic apparatus according to claim 1, wherein the case is provided separate from a housing of the electronic apparatus, and the case is attached to the electronic apparatus by connection to the housing.

6. The electronic apparatus according to claim 1, wherein a scheme of the electromechanical acoustic transducer is selected from the group consisting of an electrodynamic type, an electromagnetic type, a piezoelectric type, and an electrostatic type.

7. A touch pad unit to be attached to an electronic apparatus, comprising:
   a touch pad;
   a unit case for supporting an outer circumferential portion of the touch pad via a suspension to provide a space for sound emission between the case and the touch pad; and
   an electromechanical acoustic transducer for emitting sound into the space, the electromechanical acoustic transducer being connected to the unit case,
   wherein when the electromechanical acoustic transducer emits the sound into the space, an energy of the sound emitted causes the touch pad to vibrate and thereby to output sound outside the touch pad unit.

* * * * *